No. 700,349. Patented May 20, 1902.
S. H. MADSEN.
BRAKE AND BELL FOR VEHICLES.
(Application filed Nov. 4, 1901.)
(No Model.)
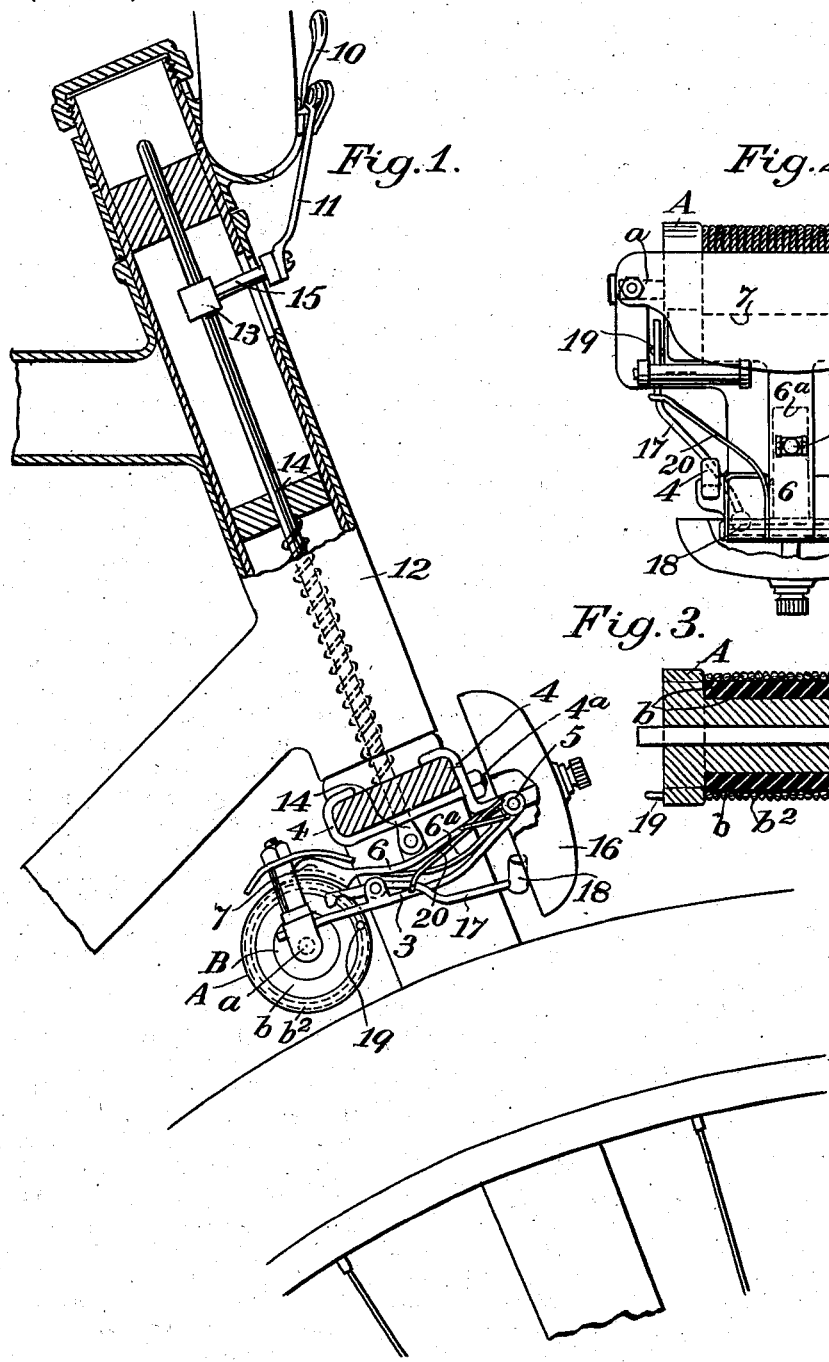

UNITED STATES PATENT OFFICE.

SOREN H. MADSEN, OF HAYWARD, CALIFORNIA.

BRAKE AND BELL FOR VEHICLES.

SPECIFICATION forming part of Letters Patent No. 700,349, dated May 20, 1902.

Application filed November 4, 1901. Serial No. 81,030. (No model.)

*To all whom it may concern:*

Be it known that I, SOREN H. MADSEN, a citizen of the United States, residing at Hayward, county of Alameda, State of California, have invented an Improvement in Brakes and Bells for Vehicles; and I hereby declare the following to be a full, clear, and exact description of the same.

My invention relates to a combined brake and bell mechanism for vehicles; and it consists of the parts and the constructions and combinations of parts, which I will hereinafter describe and claim.

Figure 1 is a sectional elevation of the upper part of the steering head-post of a bicycle, illustrating the application of my invention. Fig. 2 is a plan view of my invention. Fig. 3 is a vertical longitudinal section of the friction-roller.

As shown in the accompanying drawings, my invention is applied so as to be used in conjunction with the front wheel of the bicycle or similar vehicle; but it will be understood that it may be applied to the rear wheel or to any wheel of another vehicle by such mechanical changes as will be required for its changed position, such devices not forming a part of the present application.

As here shown, 3 is a frame or plate of metal having fulcrum-pins, as shown at 5, which pivotally connect it with a clamp 4, by which it is firmly fixed to a suitable part of the front portion of the bicycle.

As here shown, the clamp consists of oppositely-curved hooks, one of which is adapted to clasp one side and the other the opposite side of the fork head or sides, as shown, and by means of a nut $4^a$ the clamp may be tightened as firmly as may be desired. The opposite end of the plate is forked or suitably formed to receive the journal pins or shaft $a$ of a roller, the ends of which consist of steel bands or sleeves suitably clamped or secured upon a central roller B, which may be made of wood or other suitable material. Between the metal bands A the roller is formed by an inner sleeve $b$, preferably of rubber or equivalent elastic material. Outside of this is a coating formed of winding-cords $b^2$ of sufficient hardness and toughness to form a contact-surface with the tire of the wheel, which central portion is of less diameter than the bands A. The position of the plate 3 and the roller B, which is journaled between its forked ends, is such that this central part of the roller, formed of the elastic interior and outer surface of cords, will contact with the tire of the bicycle when the two are forced into contact, and the roller will be caused to rotate as long as the two are maintained in contact.

In order to check the roller and produce a sufficient frictional contact with the wheel to retard the rotation of the latter without allowing the roller to slide and wear the tire of the wheel, I have shown a pressure-plate 7, the ends of which are made of soft iron, fiber, or other suitable wearing material, which will when compressed into contact with the steel bands A of the roller form a sufficient frictional contact to retard the revolution of the roller and correspondingly retard that of the wheel without an actual rubbing contact with the wheel-tire itself. The friction of the wheel-tire against the roller in this case causes the latter to be rotated, and the actual rubbing friction is transferred through the steel bands A to the frictional wear-plate 7, which latter may be easily renewed at any time. This plate 7 is carried by an arm 6, which is pivoted upon the pin 5, preferably intermediate between the ends of the plate 3, by cutting out a sufficient portion to admit the hinge of this arm in the same manner that the center and outside leaves of a hinge are connected with a single pin. The plate 6 may be normally raised to keep the shoe 7 out of contact with the roller A by means of a spring $6^a$ of any suitable form and construction. The plate 6 has pivotally connected with it a rod 14. This rod is here shown as passing up through the center of the steering head-post 12, having its lower end pivoted to the plate 6 and the upper end screw-threaded and passing through a nut 13, by which the parts may be adjusted. From the part 13 the pin 15 extends outwardly through a slot in the hollow steering head-post 12, and this pin serves to connect the rod 14 with the brake-lever 10 by the interposition of a link or connecting-rod 11.

The brake-lever is suitably fulcrumed upon the handle-bar, so as to be within easy reach of the rider.

Any of the various forms of brake-levers or connecting devices may be easily applied to this apparatus. I have here shown the brake device as being so fixed to the front portion of the machine that the brake-roller is located just in rear of the bicycle front forks and beneath the lower bar of the frame; but it will be understood that, if desired, the position may be reversed and the roller press upon the wheel-tire in front of the forks, in which case the pivot 5 would be at the rear instead of at the front.

The pressure-plate 7 is so located in either case as to be in front of a line passing through the axis of the roller and the point of contact with the wheel-tire, experience showing that this is the best relative position for the most efficient braking effect.

16 is a bell supported from the plate 3 by an arm secured thereto and projecting so that the bell may be fixed to the arm, preferably at the front.

17 is a spring-pressed lever suitably journaled upon a frame 3 and carrying at one end a head 18, which is adapted to strike the bell. The opposite end of the lever extends to a point where it will be engaged by a lug 19, carried by the brake-roller A. This pin or lug engages the end of the hammer-lever at each revolution of the roller A, thus lifting the hammer, and when released from the pin 19 a spring 20 acts to move the lever and cause the hammer to strike the bell. Thus by a light pressure upon the brake-lever the rod 14 will act to depress the whole device, so that the roller will contact with the wheel with a light rolling movement, which will act to sound the bell without sensibly checking the movement of the machine. By a further heavier pressure the roller is forced more firmly into contact with the wheel, and at the same time the pressure-plate 7 is forced into contact with the top of the roller with as much pressure as may be desired, thus checking or stopping the wheel and the machine to which it is attached.

Having thus described my invention, what I claim, and desire to secure by Letters Patent, is—

1. The combination in a bicycle-brake of clamps, means for securing them to the bicycle-head, a plate fulcrumed with relation to said clamps, and having a forked outer end, a roller journaled between said forks and including a central core, an elastic sleeve surrounding the core and metal bands upon the ends of the core, said sleeve having the portion between the bands of less diameter than said bands, and provided with a spiral wrapping of cords, a pressure-plate having shoes adapted to press upon the metal end bands of the roller in opposition to the pressure of the central portion of the tire, a spring acting upon said plate to hold the shoes normally out of contact with the roller, a guided rod connected to the plate, and extending upwardly, and a brake-lever for actuating the rod.

2. The combination in a bicycle-brake of a clamp, means by which it is secured to the bicycle-fork, a plate pivotally mounted at one end and having its other end forked, a roller journaled between said forks and including a core having a reduced central portion and an elastic sleeve fitting said reduced portion, and metal bands on the ends of the core, means whereby the roller is pressed into contact with the tire, a pressure-plate to engage said end bands of the roller and means for actuating said pressure-plate, a bell carried by the first-named plate, a hammer fulcrumed to the plate, and a pin carried by the roller and engaging said arm, and causing the hammer to act upon the bell.

3. The combination in a bicycle-brake of a clamp, means by which it is secured to the bicycle-fork, a plate pivotally mounted at one end and having the opposite end forked, a roller mounted in the forked end of the plate having inelastic ends and an elastic intermediate portion to be forced into contact with the tire, a fulcrumed pressure-plate having shoes to engage the inelastic ends of the roller and means for actuating the pressure-plate to press the elastic portion of the roller into contact with the tire, a bell and its actuating-hammer, and a pin carried by the roller for actuating the hammer substantially simultaneously with the application of the brake-roller to the tire.

4. In a bicycle-brake the combination of a plate pivotally mounted at one end and having a forked opposite end a roller mounted in said forked end and comprising a core the central portion of which is of less diameter than the ends, metal bands upon said ends and an elastic sleeve upon the reduced central portion, cords wound transversely around said sleeve between said ends and forming the bearing-surface of the roller, a pressure-plate fulcrumed at one end and carrying a shoe at the other end, to engage said metal bands, and a means for depressing the plate to cause it to force the corded surface of the roller into contact with the wheel-tire.

5. The combination in a bicycle-brake of a clamp, two levers, one above the other and independently movable, and a single axis about which both levers are movable, a roller journaled in the lower lever and adapted to press upon the wheel of the machine, said roller having a core with reduced central portion and metal bands upon the ends, and a yielding surface upon the reduced portion, a shoe carried by the upper lever, and adapted to press upon the end bands of the roller, an interposed spring by which the levers are normally separated, a rod connected with the upper lever and means for applying pressure whereby the roller is first brought into contact with the wheel, and the shoe subsequently caused to press upon the roller.

6. The combination with a bicycle of a clamp, superposed levers fulcrumed thereto, a roller journaled in the lower lever and adapted to contact with the wheel, said roller including a central core with a reduced portion between its ends and metal bands upon said ends, and a yielding surface on said reduced portion, a shoe carried by the upper lever above the roller and adapted to press on said bands, a spring by which the levers are normally separated, a bell and a fulcrumed hammer-lever, a pin upon the roller contacting with said lever, and a means for applying pressure through the upper lever whereby the roller is first placed in contact with the wheel to sound the bell, and a further pressure forces the shoe into contact with the roller.

In witness whereof I have hereunto set my hand.

SOREN H. MADSEN.

Witnesses:
S. H. NOURSE,
JESSIE C. BRODIE.